(12) United States Patent
Li et al.

(10) Patent No.: US 10,082,689 B2
(45) Date of Patent: Sep. 25, 2018

(54) LIQUID CRYSTAL DISPLAY, LIQUID CRYSTAL DISPLAY TESTING METHOD, AND ELECTRONIC APPARATUS

(71) Applicant: Huawei Device (Dongguan) Co., Ltd., Dongguan (CN)

(72) Inventors: Xiang Li, Beijing (CN); Dongjie Wang, Beijing (CN); Yi Yang, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 140 days.

(21) Appl. No.: 14/901,868

(22) PCT Filed: Jan. 16, 2014

(86) PCT No.: PCT/CN2014/070698
§ 371 (c)(1),
(2) Date: Dec. 29, 2015

(87) PCT Pub. No.: WO2015/106414
PCT Pub. Date: Jul. 23, 2015

(65) Prior Publication Data
US 2016/0370613 A1    Dec. 22, 2016

(51) Int. Cl.
*G01R 31/00* (2006.01)
*G09G 3/36* (2006.01)
(Continued)

(52) U.S. Cl.
CPC .......... *G02F 1/1309* (2013.01); *G02F 1/1337* (2013.01); *G02F 1/13306* (2013.01);
(Continued)

(58) Field of Classification Search
CPC ............ G02F 1/1309; G02F 1/134309; G02F 1/133514; G02F 1/13306; G02F 1/1337;
(Continued)

(56) References Cited

U.S. PATENT DOCUMENTS 6,525,705 B1 * 2/2003 Ishii .................... G02F 1/13452
345/87
2006/0038580 A1    2/2006 Hasegawa et al.
(Continued)

FOREIGN PATENT DOCUMENTS

CN    1725064 A    1/2006
CN    1890787 A    1/2007
(Continued)

*Primary Examiner* — Farhana Hoque

(57) ABSTRACT

A liquid crystal display includes a glass substrate and a driver chip. The liquid crystal display further includes a testing line formed in the glass substrate and extending close to an edge of the glass substrate. The driver chip includes an input pin and an output pin, and two ends of the testing line are separately connected to the input pin and the output pin to form a closed loop. Whether the glass substrate has a crack is determined by measuring whether the testing line is in a closed circuit. The present invention further provides an electronic apparatus and a liquid crystal display testing method. In the present invention, whether a glass substrate has a crack is determined by detecting whether a testing line is in a closed circuit, so as to implement automatic detection without disassembling, thereby increasing detection efficiency.

9 Claims, 4 Drawing Sheets

(51) Int. Cl.
  *G02F 1/13*    (2006.01)
  *G02F 1/1362*  (2006.01)
  *G02F 1/133*   (2006.01)
  *G02F 1/1335*  (2006.01)
  *G02F 1/1337*  (2006.01)
  *G02F 1/1343*  (2006.01)
  G02F 1/1368    (2006.01)
  G02F 1/1333    (2006.01)

(52) U.S. Cl.
  CPC .. *G02F 1/133514* (2013.01); *G02F 1/134309* (2013.01); *G02F 1/136286* (2013.01); *G02F 1/1368* (2013.01); *G02F 2001/133302* (2013.01); *G02F 2001/136295* (2013.01); *G02F 2201/121* (2013.01); *G02F 2201/123* (2013.01); *G02F 2202/28* (2013.01)

(58) Field of Classification Search
  CPC ............. G02F 1/136286; G02F 1/1368; G02F 2201/123; G02F 2201/121; G02F 2001/136295; G02F 2001/133302; G02F 2202/28
  USPC ........................ 324/757.01, 760.01; 345/87
  See application file for complete search history.

(56) References Cited

U.S. PATENT DOCUMENTS

| | | | |
|---|---|---|---|
| 2008/0035306 A1* | 2/2008 | White | C23C 16/4586 165/61 |
| 2010/0134137 A1 | 6/2010 | Kida | |
| 2011/0097834 A1 | 4/2011 | Yamazaki et al. | |
| 2012/0261663 A1 | 10/2012 | Tsuji | |
| 2013/0082843 A1 | 4/2013 | Wurzel et al. | |
| 2013/0083457 A1 | 4/2013 | Wurzel et al. | |

FOREIGN PATENT DOCUMENTS

| | | | |
|---|---|---|---|
| CN | 201007763 Y | | 1/2008 |
| CN | 101847357 A | | 9/2010 |
| CN | 102338943 A | | 2/2012 |
| JP | 2005210083 A | | 8/2005 |
| JP | 200638988 A | | 2/2006 |
| JP | 2007164087 A | | 6/2007 |
| JP | 2011149979 A | | 8/2011 |
| JP | 2013011663 | * | 1/2013 |
| JP | 2013011663 A | | 1/2013 |
| JP | 201347697 A | | 3/2013 |
| KR | 20070111717 A | | 11/2007 |
| TW | 201319518 A | | 5/2013 |
| WO | 2008136153 A1 | | 11/2008 |
| WO | 2013049315 A1 | | 4/2013 |

\* cited by examiner

US 10,082,689 B2

LIQUID CRYSTAL DISPLAY, LIQUID CRYSTAL DISPLAY TESTING METHOD, AND ELECTRONIC APPARATUS

CROSS REFERENCE TO RELATED APPLICATIONS

The present application claims priority under 35 U.S.C. § 365 to International Patent Application No. PCT/CN2014/070698 filed Jan. 16, 2014 and which is incorporated herein by reference into the present disclosure as if fully set forth herein.

TECHNICAL FIELD

The present invention relates to liquid crystal displays (Liquid Crystal Display, LCD), and in particular, to an LCD with an LCD glass crack detection architecture, an LCD testing method, and an electronic apparatus including the LCD.

BACKGROUND

In a manufacturing process such as cutting and assembling an LCD, and in an assembly process of an integrated machine of an electronic apparatus, a single-layer glass crack, that is, a microcrack, on an LCD may be caused by a problem in assembly technology, assembly device, or the like. In the prior art, microcrack detection is performed by using visual inspection or microscopic examination. However, missed detection of a blind crack is prone to occur in the visual inspection, and because a view in a case of the microscopic examination is excessively small, and a detected area cannot completely cover all marginal areas of an entire piece of glass, missed detection is also most likely to occur; in addition, whether the visual inspection or the microscopic examination is used, an electronic product needs to be disassembled, and testing is performed on an LCD after the LCD is detached, which is a complex testing process.

SUMMARY

Embodiments of the present invention provide an LCD, an LCD testing method, and an electronic apparatus including the LCD, which are used to automatically detect whether an LCD has a crack.

According to one aspect, the present invention provides a liquid crystal display, including a glass substrate and a driver chip, where the driver chip is disposed on the glass substrate and is configured to drive the liquid crystal display, where the liquid crystal display further includes a testing line, the testing line is formed in the glass substrate and extends close to an edge of the glass substrate, the driver chip includes an input pin and an output pin, and two ends of the testing line are separately connected to the input pin and the output pin to form a closed loop.

The testing line includes at least two single lines, and the at least two single lines are connected in parallel between the input pin and the output pin.

There is one input pin, there is also one output pin, the at least two single lines are combined at one end and connected to the input pin, and the at least two single lines are combined at the other end and connected to the output pin.

The glass substrate includes an upper layer plate and a lower layer plate, where the upper layer plate includes a color film, a color film protecting layer, and an upper liquid crystal alignment film that are stacked, the lower layer plate includes a common electrode layer, a pixel electrode layer, and a lower liquid crystal alignment film that are stacked, the testing line is formed at an edge of the common electrode layer or is formed at an edge of the pixel electrode layer, and the testing line is electrically connected to the driver chip by a wire on the lower layer plate.

The glass substrate includes an upper layer plate and a lower layer plate, where the upper layer plate includes a color film, a color film protecting layer, and an upper liquid crystal alignment film that are stacked, the lower layer plate includes a common electrode layer, a pixel electrode layer, and a lower liquid crystal alignment film that are stacked, the testing line is formed on the upper layer plate and is located at a periphery of the upper liquid crystal alignment film, the liquid crystal display further includes a conductive sheet, the conductive sheet is formed on the lower layer plate and is located at a periphery of the lower liquid crystal alignment film, the testing line is electrically connected to the conductive sheet by a conductive adhesive, and the testing line is electrically connected to the driver chip by a wire on the lower layer plate.

The present invention further provides an electronic apparatus, including a CPU and a flexible circuit board, where the electronic apparatus further includes the liquid crystal display according to any one of the foregoing descriptions, the liquid crystal display is electrically connected to the CPU by the flexible circuit board, and the CPU is configured to determine whether the testing line is in a closed circuit.

According to another aspect, the present invention further provides a liquid crystal display testing method, where the liquid crystal display testing method includes: forming a testing line on a glass substrate, where the testing line extends close to an edge of the glass substrate; separately connecting two ends of the testing line to an input pin and an output pin that are of a driver chip, so that the testing line forms a closed loop; inputting voltage at an input pin end of the driver chip, and measuring, at the output pin end, a current value of the closed loop or a resistance value of the closed loop; and feeding back the current value or the resistance value to a CPU of an electronic apparatus, where the CPU is configured to determine whether the testing line is in a closed circuit, so as to determine whether the glass substrate has a crack.

A process of forming the testing line on the glass substrate includes connecting in parallel at least two single lines between the input pin and the output pin.

The at least two single lines are combined at one end and connected to the input pin, the at least two single lines are combined at the other end and connected to the output pin, there is one input pin, and there is also one output pin.

The glass substrate includes an upper layer plate and a lower layer plate, where the upper layer plate includes a color film, a color film protecting layer, and an upper liquid crystal alignment film that are stacked, the lower layer plate includes a common electrode layer, a pixel electrode layer, and a lower liquid crystal alignment film that are stacked, the testing line is formed at an edge of the common electrode layer or is formed at an edge of the pixel electrode layer, and the testing line is electrically connected to the driver chip by a wire on the lower layer plate.

The glass substrate includes an upper layer plate and a lower layer plate, where the upper layer plate includes a color film, a color film protecting layer, and an upper liquid crystal alignment film that are stacked, the lower layer plate includes a common electrode layer, a pixel electrode layer, and a lower liquid crystal alignment film that are stacked, the testing line is formed on the upper layer plate and is located at a periphery of the upper liquid crystal alignment film, the liquid crystal display further includes a conductive sheet, the conductive sheet is formed on the lower layer plate and is located at a periphery of the lower liquid crystal alignment film, the testing line is electrically connected to the conductive sheet by a conductive adhesive, and the testing line is electrically connected to the driver chip by a wire on the lower layer plate.

The testing line is formed on the glass substrate by using a deposition or vapor deposition method, where a material of the testing line is an indium tin oxide.

Compared with the prior art, according to the liquid crystal display, the electronic apparatus, and the liquid crystal display testing method provided by the present invention, whether a glass substrate has a crack is determined by detecting whether a testing line is in a closed circuit, so as to implement automatic detection without disassembling, thereby increasing detection efficiency.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
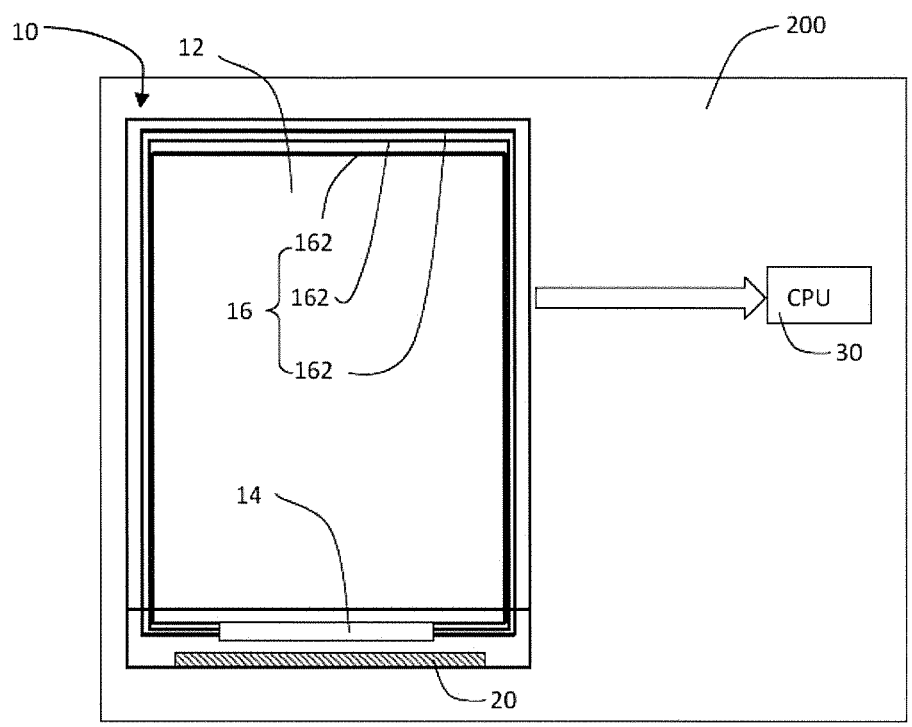
FIG. 1 is a schematic diagram of an electronic apparatus and a liquid crystal display according to an implementation manner of the present invention.

Referring to FIG. 1, the present invention relates to a liquid crystal display 10 and an electronic apparatus 200 using the liquid crystal display 10, where the electronic apparatus 200 includes a CPU 30, a flexible circuit board 20, and the liquid crystal display 10. The flexible circuit board 20 is electrically connected between the liquid crystal display 10 and the CPU 30. In the present invention, a testing line 16 is disposed on a glass substrate 12 of the liquid crystal display 10, and whether the testing line 16 of the liquid crystal display 10 is in a closed circuit is determined by using the CPU 30 of the electronic apparatus 200, thereby determining whether the glass substrate 12 of the liquid crystal display 10 has a crack.

The liquid crystal display 10 includes the glass substrate 12 and a driver chip 14, where the driver chip 14 is disposed on the glass substrate 12 and is configured to drive display on the liquid crystal display 10. The liquid crystal display 10 further includes the testing line 16, where the testing line 16 is formed in the glass substrate 12 and extends close to an edge of the glass substrate 12. The testing line 16 is formed on the glass substrate 12 by using a deposition or vapor deposition technology, where the deposition method includes magnetron sputtering at low deposition temperature, electrochemical deposition, sputtering deposition, chemical vapor deposition, and the like. The testing line 16 and the glass substrate 12 combine into a whole. If the glass substrate 12 has a crack, the crack generally occurs at an edge position of the glass substrate 12. The testing line 16 is formed at the edge position of the glass substrate 12 and continuously extends into a loop structure. If an edge of the glass substrate 12 cracks, the testing line 16 also cracks accordingly. In this implementation manner, a material of the testing line 16 is an indium tin oxide (ITO). The driver chip 14 includes an input pin and an output pin, and two ends of the testing line 16 are separately connected to the input pin and the output pin to form a closed loop. In this way, whether the glass substrate 12 has a crack can be determined by detecting whether the testing line 16 is in the closed circuit. Actually, the liquid crystal display and a testing apparatus may be connected to detect whether the testing line 16 is in the closed circuit, which may also be detected directly by using an electronic apparatus that is installed with the liquid crystal display, such as a CPU of an electronic apparatus or built-in detection software of an electronic apparatus.

The driver chip 14 of the liquid crystal display 10 is configured to drive the liquid crystal display 10 to display a pattern, but the driver chip 14 includes some idle pins. In the present invention, the idle pins of the driver chip 14 are used as the input pin and the output pin of the testing line 16; therefore, in a production process, only the testing line 16 is required to form at the edge of the glass substrate 12, and no other extra costs are required.

According to the liquid crystal display 10 and the electronic apparatus 200 that are provided by the present invention, whether a glass substrate 12 has a crack is determined by detecting whether a testing line 16 is in a closed circuit, so as to implement automatic detection without disassembling. If the glass substrate 12 has a crack that leads to a circuit break of the testing line 16, a driver chip 14 feeds back a current value or a resistance value that is measured at an output pin of the driver chip 14 and that is of the closed loop to a CPU 30. Whether the glass substrate 12 has a crack is determined by using testing software of the electronic apparatus 200, thereby increasing detection efficiency.

A quantity of testing lines 16 in the present invention may be one or more, so as to achieve a same objective. In an implementation manner, the testing line 16 includes at least two single lines 162, and the at least two single lines 162 are connected in parallel between the input pin and the output pin. As shown in FIG. 1, in this implementation manner, the testing line 16 includes three single lines 162. A design of at least two single lines 162 that are in parallel can better cover a test range, and can also avoid a problem of determining, by mistake, that a glass substrate 12 cracks, which is caused by a circuit break of a single testing line 16 that is resulted from a poor technology or a foreign body in a manufacturing process.

Figure 2:
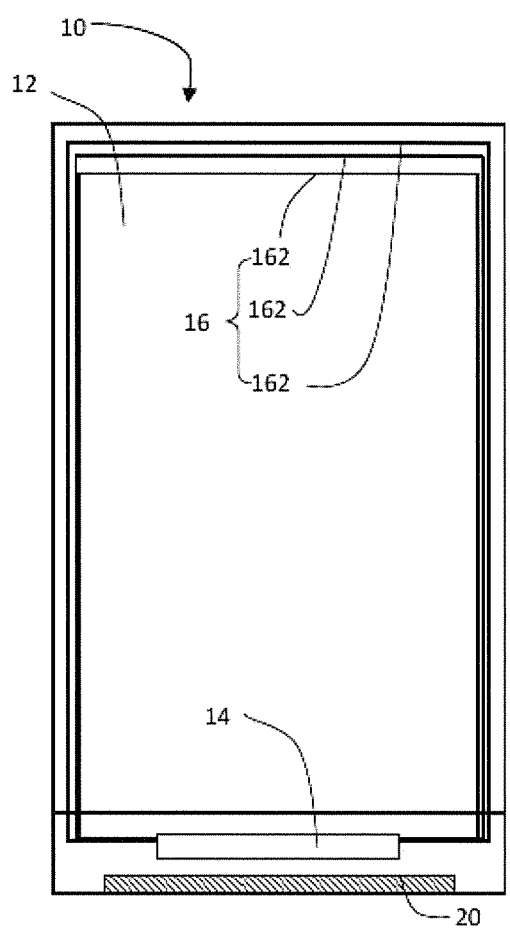
FIG. 2 is a schematic diagram of a liquid crystal display according to an implementation manner of the present invention.

Referring to FIG. 2, there is one input pin, there is also one output pin, the at least two single lines 162 are combined at one end and connected to the input pin, and the at least two single lines 162 are combined at the other end and connected to the output pin. That is, in this implementation manner, the at least two single lines 162 are combined into one at both ends; in this way, the testing line 16 needs only two pins of the driver chip 14, that is, one input pin and one output pin, so that pins of the driver chip 14 are economically used, which facilitates adding another function of the electronic apparatus 200.

Figure 3:
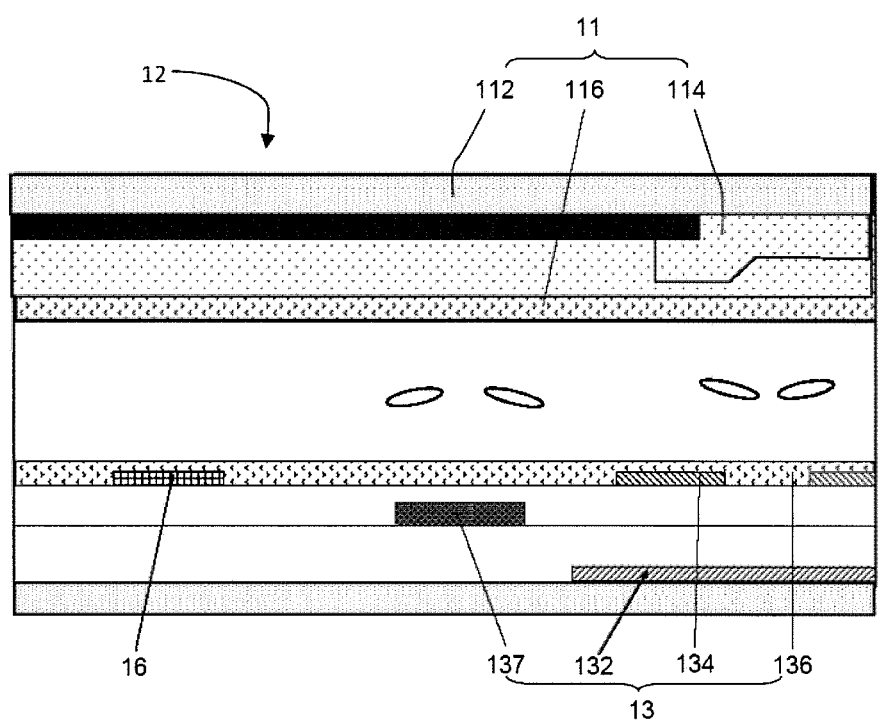
FIG. 3 is an enlarged schematic diagram of a first implementation manner of a glass substrate of a liquid crystal display according to the present invention.
Figure 4:
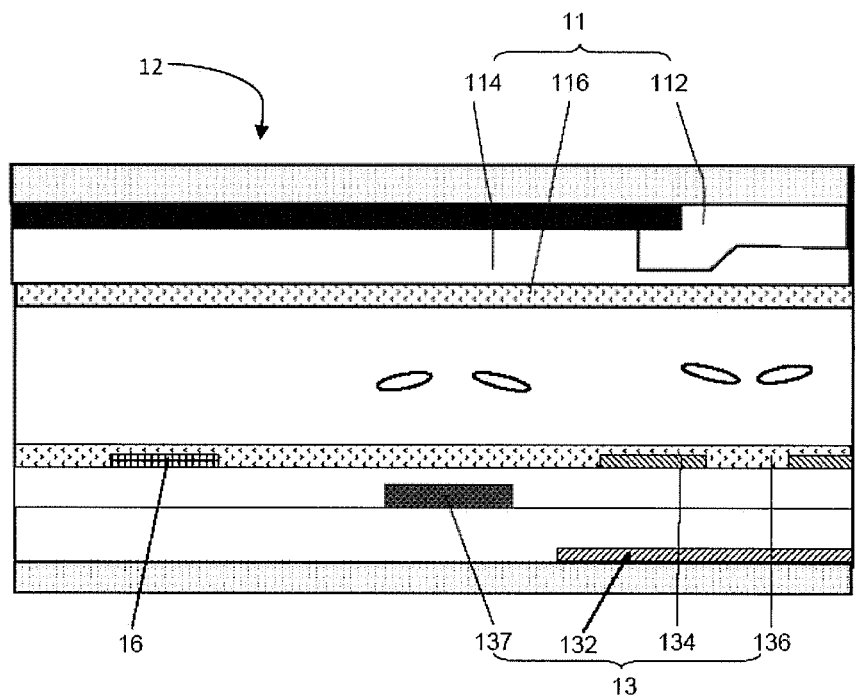
FIG. 4 is an enlarged schematic diagram of a second implementation manner of a glass substrate of a liquid crystal display according to the present invention.
Figure 5:
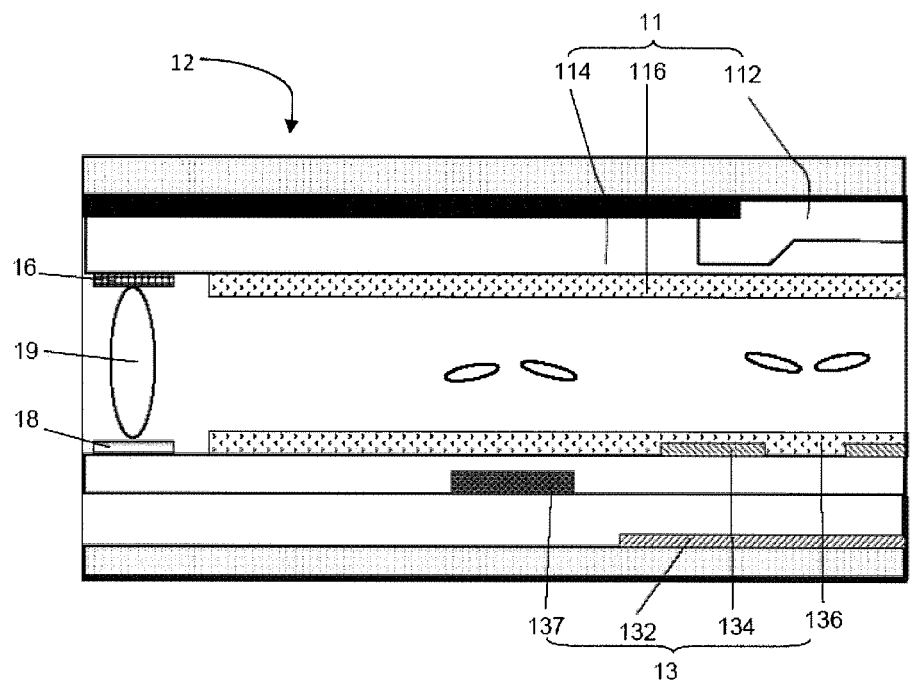
FIG. 5 is an enlarged schematic diagram of a third implementation manner of a glass substrate of a liquid crystal display according to the present invention.

In this implementation manner, the glass substrate 12 is a piece of double-layer glass. Referring to FIG. 3 to FIG. 5, the glass substrate 12 includes an upper layer plate 11 and a lower layer plate 13, where the upper layer plate 11 is a color film 112 substrate and is located on a surface layer of the electronic apparatus 200, and the lower layer plate 13 is a thin film transistor switch circuit substrate (TFT circuit glass substrate). The upper layer plate 11 includes a color film 112, a color film protecting layer 114, and an upper liquid crystal alignment film 116 that are stacked, and the lower layer plate 13 includes a common electrode layer 132, a signal cable layer 137, a pixel electrode layer 134, and a lower liquid crystal alignment film 136 that are stacked.

In a first implementation manner, as shown in FIG. 3, the testing line 16 is formed at an edge of the pixel electrode layer 134, and the testing line 16 is electrically connected to the driver chip 14 by a wire on the lower layer plate 13. The testing line 16 in this implementation manner is configured to detect whether the lower layer plate 13 has a crack.

In a second implementation manner, as shown in FIG. 4, the testing line 16 is formed at an edge of the common electrode layer 132, and the testing line 16 is electrically connected to the driver chip 14 by a wire on the lower layer plate 13. The testing line 16 in this implementation manner is configured to detect whether the lower layer plate 13 has a crack.

In a third implementation manner, as shown in FIG. 5, the testing line 16 is formed on the upper layer plate 11 and is located at a periphery of the upper liquid crystal alignment film 116. The liquid crystal display 10 further includes a conductive sheet 18, and the conductive sheet 18 is formed on the lower layer plate 13 and is located at a periphery of the lower liquid crystal alignment film 136. The testing line 16 is electrically connected to the conductive sheet 18 by a conductive adhesive 19, and the testing line 16 is electrically connected to the driver chip 14 by a wire on the lower layer plate 13. The testing line 16 in this implementation manner is configured to detect whether the upper layer plate 11 has a crack.

If it needs to be detected simultaneously whether the upper layer plate 11 and the lower layer plate 13 have a crack, the forgoing third implementation manner and the first implementation manner may be simultaneously used, or the foregoing third implementation manner and the second implementation manner may be simultaneously used.

According to another aspect, the present invention further provides a liquid crystal display 10 testing method, where the liquid crystal display 10 testing method includes: forming a testing line 16 on a glass substrate 12, where the testing line 16 extends close to an edge of the glass substrate 12; separately connecting two ends of the testing line 16 to an input pin and an output pin that are of a driver chip 14, so that the testing line 16 forms a closed loop; inputting voltage at an input pin end of the driver chip 14, and measuring, at the output pin end, a current value of the closed loop or a resistance value of the closed loop; and feeding back the current value or the resistance value to a CPU 30 of an electronic apparatus 200, where the CPU 30 is configured to determine whether the testing line 16 of the liquid crystal display 10 is in a closed circuit, so as to determine whether the glass substrate 12 has a crack.

A process of forming the testing line 16 on the glass substrate 12 includes connecting in parallel at least two single lines 162 between the input pin and the output pin.

The at least two single lines 162 are combined at one end and connected to the input pin, the at least two single lines 162 are combined at the other end and connected to the output pin, there is one input pin, and there is also one output pin.

The glass substrate 12 includes an upper layer plate 11 and a lower layer plate 13, where the upper layer plate 11 includes a color film 112, a color film protecting layer 114, and an upper liquid crystal alignment film 116 that are stacked, the lower layer plate 13 includes a common electrode layer 132, a pixel electrode layer 134, and a lower liquid crystal alignment film 136 that are stacked, the testing line 16 is formed at an edge of the common electrode layer 132 or is formed at an edge of the pixel electrode layer 134, and the testing line 16 is electrically connected to the driver chip 14 by a wire on the lower layer plate 13. The testing line 16 is formed by using a deposition or vapor deposition method at the common electrode layer 132 or the pixel electrode layer 134 of the lower layer plate 13. When a common electrode or a pixel electrode is made on the lower layer plate 13, only a mask design of the common electrode layer 132 or the pixel electrode layer 134 needs to be modified, and no material costs or device occupancy costs needs to be added. This implementation manner aims at crack detection of the lower layer plate 13.

A crack detection method for the upper layer plate 11 is as follows: the testing line 16 is formed on the upper layer plate 11 and is located at a periphery of the upper liquid crystal alignment film 116; the liquid crystal display 10 further includes a conductive sheet 18, and the conductive sheet 18 is formed on the lower layer plate 13 and is located at a periphery of the lower liquid crystal alignment film 136; the testing line 16 is electrically connected to the conductive sheet 18 by a conductive adhesive 19, and the testing line 16 is electrically connected to the driver chip 14 by a wire on the lower layer plate 13.

In the present invention, the testing line 16 is formed on the glass substrate by using a deposition or vapor deposition method, where a material of the testing line 16 is an indium tin oxide. The deposition method includes magnetron sputtering at low deposition temperature, electrochemical deposition, sputtering deposition, chemical vapor deposition, and the like.

The foregoing describes in detail a cassette and a mobile terminal that are provided by the embodiments of the present invention. Although the principles and implementation manners of the present invention are described by using specific examples, the foregoing embodiments are only intended to help understand the method and core idea of the present invention. In addition, with respect to the specific implementation manners and applicability, modifications may be made by a person of ordinary skill in the art according to the idea of the present invention. Therefore, the specification shall not be construed as a limitation on the present invention.

What is claimed is:

1. A liquid crystal display, comprising:
   a glass substrate;
   a driver chip disposed on the glass substrate and configured to drive the liquid crystal display, wherein the driver chip comprises an input pin and an output pin;
   a testing line formed in the glass substrate and extending close to an edge of the glass substrate, wherein two ends of the testing line are separately connected to the input pin and the output pin to four a closed loop;
   wherein the glass substrate comprises:
      an upper layer plate comprising a color film, a color film protecting layer, and an upper liquid crystal alignment film that are stacked, and
      a lower layer plate comprising a common electrode layer, a pixel electrode layer, and a lower liquid crystal alignment film that are stacked; and
   wherein the testing line is formed at an edge of the common electrode layer or is formed at an edge of the pixel electrode layer, and the testing line is electrically connected to the driver chip by a wire on the lower layer plate.

2. The liquid crystal display according to claim 1, wherein the testing line comprises at least two single lines connected in parallel between the input pin and the output pin.

3. The liquid crystal display according to claim 2, wherein there is one input pin, there is also one output pin, the at least two single lines are combined at one end and connected to the input pin, and the at least two single lines are combined at the other end and connected to the output pin.

4. A liquid crystal display, comprising:
   a glass substrate;
   a driver chip disposed on the glass substrate and configured to drive the liquid crystal display, wherein the driver chip comprises an input pin and an output pin;
   a testing line formed in the glass substrate and extending close to an edge of the glass substrate, wherein two ends of the testing line are separately connected to the input pin and the output pin to form a closed loop;
   wherein the glass substrate comprises:
      an upper layer plate comprising a color film, a color film protecting layer, and an upper liquid crystal alignment film that are stacked, and
      a lower layer plate comprising a common electrode layer, a pixel electrode layer, and a lower liquid crystal alignment film that are stacked;
   wherein the testing line is formed on the upper layer plate and is located at a periphery of the upper liquid crystal alignment film;
   a conductive sheet formed on the lower layer plate and located at a periphery of the lower liquid crystal alignment film; and
   wherein the testing line is electrically connected to the conductive sheet by a conductive adhesive, and the testing line is electrically connected to the driver chip by a wire on the lower layer plate.

5. A liquid crystal display testing method, comprising:
   forming a testing line on a glass substrate, wherein the testing line extends close to an edge of the glass substrate;
   separately connecting two ends of the testing line to an input pin and an output pin that are of a driver chip, so that the testing line forms a closed loop;
   inputting voltage at an input pin end of the driver chip, and measuring, at the output pin end, a current value of the closed loop or a resistance value of the closed loop;
   feeding back the current value or the resistance value to a CPU of an electronic apparatus, wherein the CPU is configured to determine whether the testing line is in a closed circuit, so as to determine whether the glass substrate has a crack;
   wherein the glass substrate comprises:
      an upper layer plate comprising a color film, a color film protecting layer, and an upper liquid crystal alignment film that are stacked, and
      a lower layer plate comprising a common electrode layer, a pixel electrode layer, and a lower liquid crystal alignment film that are stacked; and
   wherein the testing line is formed at an edge of the common electrode layer or is formed at an edge of the pixel electrode layer, and the testing line is electrically connected to the driver chip by a wire on the lower layer plate.

6. The liquid crystal display testing method according to claim 5, wherein forming the testing line on the glass substrate comprises connecting in parallel at least two single lines between the input pin and the output pin.

7. The liquid crystal display testing method according to claim 6, wherein the at least two single lines are combined at one end and connected to the input pin, the at least two single lines are combined at the other end and connected to the output pin, there is one input pin, and there is also one output pin.

8. The liquid crystal display testing method according to claim 5, wherein the testing line is formed on the glass substrate by using a deposition or vapor deposition method, and a material of the testing line is an indium tin oxide.

9. A liquid crystal display testing method, comprising:
   forming a testing line on a glass substrate, wherein the testing line extends close to an edge of the glass substrate;
   separately connecting two ends of the testing line to an input pin and an output pin that are of a driver chip, so that the testing line forms a closed loop;
   inputting voltage at an input pin end of the driver chip, and measuring, at the output pin end, a current value of the closed loop or a resistance value of the closed loop;
   feeding back the current value or the resistance value to a CPU of an electronic apparatus, wherein the CPU is configured to determine whether the testing line is in a closed circuit, so as to determine whether the glass substrate has a crack;
   wherein the glass substrate comprises:
      an upper layer plate comprising a color film, a color film protecting layer, and an upper liquid crystal alignment film that are stacked, and
      a lower layer plate comprising a common electrode layer, a pixel electrode layer, and a lower liquid crystal alignment film that are stacked;
   wherein the testing line is formed on the upper layer plate and is located at a periphery of the upper liquid crystal alignment film;
   wherein the liquid crystal display comprises:
      a conductive sheet formed on the lower layer plate and located at a periphery of the lower liquid crystal alignment film; and
   wherein the testing line is electrically connected to the conductive sheet by a conductive adhesive, and the testing line is electrically connected to the driver chip by a wire on the lower layer plate.

* * * * *